United States Patent
Kumar et al.

(10) Patent No.: US 9,178,255 B2
(45) Date of Patent: Nov. 3, 2015

(54) LITHIUM-AIR CELLS INCORPORATING SOLID ELECTROLYTES HAVING ENHANCED IONIC TRANSPORT AND CATALYTIC ACTIVITY

(75) Inventors: Binod Kumar, Dayton, OH (US); Jitendra Kumar, Dayton, OH (US)

(73) Assignee: University of Dayton, Dayton, OH (US)

( * ) Notice: Subject to any disclaimer, the term of this patent is extended or adjusted under 35 U.S.C. 154(b) by 1172 days.

(21) Appl. No.: 12/486,444

(22) Filed: Jun. 17, 2009

(65) Prior Publication Data

US 2009/0317724 A1    Dec. 24, 2009

Related U.S. Application Data

(60) Provisional application No. 61/074,316, filed on Jun. 20, 2008.

(51) Int. Cl.
*H01M 4/86* (2006.01)
*H01M 12/08* (2006.01)
*H01M 10/056* (2010.01)
(Continued)

(52) U.S. Cl.
CPC ............ *H01M 12/08* (2013.01); *H01M 10/056* (2013.01); *H01M 10/0562* (2013.01); *H01M 10/0565* (2013.01); *C04B 35/447* (2013.01); *C04B 2235/3203* (2013.01); *C04B 2235/3217* (2013.01); *C04B 2235/3287* (2013.01); *H01M 4/382* (2013.01); *H01M 4/8605* (2013.01); *H01M 4/8621* (2013.01); *H01M 4/8652* (2013.01); *H01M 4/9016* (2013.01); *H01M 4/96* (2013.01); *H01M 2300/0068* (2013.01); *H01M 2300/0082* (2013.01); *H01M 2300/0091* (2013.01); *H01M 2300/0094* (2013.01)

(58) Field of Classification Search
CPC . H01M 12/08; H01M 4/8605; H01M 4/8621; H01M 4/8652; H01M 4/9016; H01M 4/96; H01M 4/382; H01M 2300/0091; H01M 2300/0094; H01M 2300/0068; H01M 10/0562; H01M 10/056; C04B 2235/3217; C04B 2235/3287; C04B 2235/3203; C04B 35/447
USPC .......................................... 429/29, 304–322
See application file for complete search history.

(56) References Cited

U.S. PATENT DOCUMENTS 6,190,806 B1    2/2001   Kumar et al.
2002/0055046 A1   5/2002   Ono et al.
(Continued)

FOREIGN PATENT DOCUMENTS

EP    1926164 A1    5/2008
JP    20000251938 A   9/2000
(Continued)

OTHER PUBLICATIONS

Machine Translation of JP 2000-251938.*
(Continued)

*Primary Examiner* — Milton I Cano
*Assistant Examiner* — Stephen Yanchuk
(74) *Attorney, Agent, or Firm* — Dinsmore & Shohl LLP

(57) ABSTRACT

Liquid-free lithium-air cells are provided which incorporate a solid electrolyte having enhanced ionic transport and catalytic activity. The solid electrolyte is positioned between a lithium anode and an oxygen cathode, and comprises a glass-ceramic and/or a polymer-ceramic electrolyte including a dielectric additive.

21 Claims, 3 Drawing Sheets

(51) Int. Cl.
  *H01M 10/0562*  (2010.01)
  *H01M 10/0565*  (2010.01)
  *H01M 4/90*  (2006.01)
  *C04B 35/447*  (2006.01)
  *H01M 4/38*  (2006.01)
  *H01M 4/96*  (2006.01)

(56) References Cited

U.S. PATENT DOCUMENTS

| | | | |
|---|---|---|---|
| 2004/0106046 | A1 | 6/2004 | Inda |
| 2005/0175894 | A1* | 8/2005 | Visco et al. ............. 429/212 |
| 2006/0063051 | A1* | 3/2006 | Jang ............................. 429/29 |
| 2007/0072034 | A1 | 3/2007 | Barker et al. |
| 2007/0117026 | A1 | 5/2007 | Kumar et al. |
| 2007/0141432 | A1* | 6/2007 | Wang et al. ................ 429/34 |
| 2007/0172739 | A1* | 7/2007 | Visco et al. ............... 429/322 |
| 2007/0202400 | A1* | 8/2007 | Yoshida et al. ........... 429/203 |
| 2009/0136830 | A1 | 5/2009 | Gordon |
| 2009/0246617 | A1* | 10/2009 | Howard et al. ............ 429/161 |
| 2009/0311597 | A1 | 12/2009 | Chiang et al. |
| 2010/0062341 | A1* | 3/2010 | Hambitzer ............. 429/231.95 |

FOREIGN PATENT DOCUMENTS

| | | |
|---|---|---|
| JP | 2005-166685 A | 6/2005 |
| JP | 2006-286414 A | 10/2006 |
| JP | 2007-294429 A | 11/2007 |
| JP | 2008-112661 | 5/2008 |
| WO | 2008/058685 A1 | 5/2008 |
| WO | WO 2008-058685 * | 5/2008 |

OTHER PUBLICATIONS

Extended European Search Report (EESR) dated Oct. 30, 2009 pertaining to European Application No. 09163162.2.

Leo et al, "Effect of MgO addition on the ionic conductivity of LiGe2(PO4)3 ceramics" Solid State Ionics, North Holland Pub. Company, Amsterdam, NL, vol. 159, No. 3-4, Apr. 1, 2003, pp. 357-367.

Shin et al, "Effect of fillers on the electrochemical and interfacial properties of PEO-LiN(SO2CF2CF3)2 polymer electrolytes" Electrochimica Acta, Elsevier Science Publishers, Barking, GB, vol. 49, No. 9-10, Apr. 15, 2004, pp. 1605-1612.

Choi et al, "Effects of ceramic fillers on the electrical properties of (PEO)16LiClO4 electrolytes" Journal of Power Sources, Elsevier SA, CH, vol. 68, No. 2, Oct. 1, 1997, pp. 357-360.

Choi et al, "Effects of SiC and Si3N4 fillers on the electrical properties of (PEO)16LiClO4 electrolytes" Journal of Applied Electrochemistry, vol. 27, 1997, pp. 365-367.

Croce et al, "Nanocomposite polymer electrolytes for lithium batteries" Nature, Nature Publishing Group, London, UK, vol. 394, Jul. 30, 1998, pp. 456-458.

Stephan et al, "Review on composite polymer electrolytes for lithium batteries" Polymer, Elsevier Science Publishers B.V., GB, vol. 47, No. 16, Jul. 26, 2006, pp. 5952-5964.

Binod Kumar, et al., "Space Charge Signature and Its Effects on Ionic Transport in Heterogeneous Solids", Journal American Ceramic Society, vol. 90, No. 10, pp. 3323-3325 (2007).

N. Gupta, et al., "A direct current pulse technique to enhance conductivity of heterogeneous electrolytes", Journal of Power Soures, 185 (2008) pp. 1415-1419.

Binod Kumar, et al., "Space Charge-Mediated Ionic Transport in Yttria-Stabilized Zirconia—Alumina Composite Membranes", Journal American Ceramic Society, vol. 91, No. 4, pp. 1175-1181 (2008).

Office Action pertaining to U.S. Appl. No. 13/153,042, dated Dec. 12, 2011.

Office Action pertaining to U.S. Appl. No. 13/153,042, dated Aug. 7, 2012.

Thokchom et al., "Water Durable Lithium Ion Conducting Composite Membranes from the Li2O—Al2O3—TiO2—P2O5 Glass-Ceramic", Journal of the Electrochemical Society 154 (4); pp. A331-A336, Feb. 20, 2007.

Office Action from JP Appln. No. 2009-146185 mailed Oct. 11, 2013.
Office Action pertaining to U.S. Appl. No. 13/153,042 dated May 22, 2013.

Final Office Action pertaining to U.S. Appl. No. 13/153,042 dated Jan. 30, 2013.

Non-Final Office Action dated Dec. 29, 2014 pertaining to U.S. Appl. No. 13/153,042.

* cited by examiner

LITHIUM-AIR CELLS INCORPORATING SOLID ELECTROLYTES HAVING ENHANCED IONIC TRANSPORT AND CATALYTIC ACTIVITY

CROSS REFERENCE TO RELATED APPLICATIONS

This application claims the benefit of U.S. Provisional Application No. 61/074,316, filed Jun. 20, 2008, entitled FORMATION OF IONIC CONDUCTORS AND ELECTROCHEMICAL DEVICES BASED ON A SPACE CHARGE EFFECT. The entire contents of said application are hereby incorporated by reference.

STATEMENT REGARDING FEDERALLY SPONSORED RESEARCH OR DEVELOPMENT

This invention was made with government support under Contract No. FA8650-06-3-9000 and Contract No. FA8650-08-C-2917 awarded by the United States Air Force. The government has certain rights in the invention.

BACKGROUND OF THE INVENTION

Embodiments of the present invention relate generally to electrochemical devices, and particularly, to liquid-free lithium-air cells incorporating solid electrolytes comprised of glass-ceramic and/or polymer-ceramic materials having enhanced ionic transport and catalytic activity.

In electrochemical devices such as batteries, fuel cells, and sensors, oxidation and reduction of chemical species such as hydrogen and lithium is carried out at an anode. The ionic species travel through the cell internally, i.e., from the anode through an ionic conductor or electrolyte, to a cathode. The electrolyte may be in liquid or solid form. Lithium ion batteries currently in use typically comprise a carbon anode, a porous polymer membrane containing a liquid electrolyte comprised of, for example, lithium salts dissolved in organic solvents, and a cathode comprising a transition metal oxide.

Liquid electrolytes have typically been preferred in commercial electrochemical devices such as lithium ion batteries because they exhibit high conductivity (about $10^{-3}$ to $10^{-1}$ $Scm^{-1}$). However, a high temperature environment can lead to rupture, ignition, and even explosion of liquid electrolyte-based lithium batteries due to reactions involving the liquid electrolytes, polymer membrane and the transition metal oxide cathodes. Therefore, it has become desirable to develop more thermally stable and safe lithium batteries with high energy and power densities.

While it is possible to use solid electrolytes in lithium batteries, solid electrolytes are generally associated with lower conductivity and therefore have typically been of lesser interest for commercial applications. There are a number of different approaches which have been employed to enhance the conductivity of solid electrolytes. In recent years, higher conductivity solid electrolytes have been developed using materials such as $Li_{1+x}Al_xTi_{2-x}(PO_4)_3$ and $Li_{x+1}Ge_xTi_{2-x}(PO_4)_3$. These ionic conductors have shown conductivity of about $10^{-3}$ $Scm^{-1}$ near room temperature; however, they are still typically not as conductive as liquid electrolytes.

As an alternative to lithium ion batteries, interest has increased in recent years in the development of lithium-air batteries. Such batteries comprise a lithium anode coupled to atmospheric oxygen through an air cathode such that the reduction of oxygen forms lithium peroxide. The cathode reactant (oxygen) is virtually an unlimited source in atmospheric air. Therefore, the air does not need to be carried in the battery. The primary reason for interest in developing lithium-oxygen batteries is the large theoretical energy density possible compared with state-of-the-art lithium batteries. For example, the energy density of a lithium air battery is about 3000 Wh/kg, which is about an order of magnitude greater than lithium ion batteries. In addition to the abundant air supply, the lithium air battery is also environmentally friendly and provides improved safety over the use of lithium ion batteries. However, the development of lithium-air battery cells has been hindered by the lack of suitable membranes which can contain lithium metal and safely carry out electrochemical reactions, and the limited rechargeability of the battery due to the limited cycle life of the lithium anode.

Accordingly, there remains a need in the art for a lithium-air battery utilizing an electrolyte membrane which provides efficient ionic transport, and which exhibits high conductivity and rechargeability.

SUMMARY OF THE INVENTION

Embodiments of the present invention meet those needs by providing liquid-free lithium-air cells which incorporate a solid electrolyte having enhanced ionic transport due to a space charge effect resulting from the presence of a dielectric phase. By "liquid-free," it is meant that all components of the lithium air-cell (anode, cathode and solid electrolyte) are completely free of liquid components. By "space charge effect," it is meant an accumulation of local, uncompensated charges in the solid electrolyte which may result from the ionization and adsorption of charged species at interfaces and/or on dielectric surfaces. The accumulation of the space charge results in the creation of localized electric fields that influence the transport of the remaining conduction ions, i.e., the space charge effect increases the transport of conducting ions, and thus increases conductivity.

According to one embodiment of the invention, a liquid-free rechargeable lithium-air cell is provided which comprises an anode comprising a lithium metal, an oxygen cathode, and a lithium ion-conducting solid electrolyte separating the anode and cathode and selected from at least one polymer-ceramic electrolyte, a glass ceramic electrolyte, and combinations thereof; wherein the solid electrolyte contains a dielectric additive selected from lithium oxide, boron nitride, silica, alumina, calcium oxide, zirconium oxide, titanium oxide, lithium aluminate, and silicon nitride.

The solid electrolyte may comprise a glass-ceramic electrolyte selected from lithium-aluminum-germanium-phosphate (LAGP), lithium-aluminum titanium phosphate (LATP), and derivatives thereof containing from about 0.01 to about 5 wt % $Li_2O$; a polymer-ceramic electrolyte comprising polyethylene oxide doped with $LiN(SO_2CF_2CF_3)_2$ (LiBETI) and containing from about 0.01 to about 10 wt % $Li_2O$; or a polymer-ceramic electrolyte comprising polyethylene oxide doped with $LiN(SO_2CF_2CF_3)_2$ (LiBETI) and containing from about 0.01 to about 10 wt % BN.

Alternatively, the solid electrolyte may be in the form of a laminate comprising a first polymer-ceramic composite electrolyte formed from polyethylene oxide doped with $LiN(SO_2CF_2CF_3)_2$ (LiBETI) and including from about 0.01 to about 10 wt % $Li_2O$; a glass-ceramic electrolyte selected from lithium aluminum germanium phosphate (LAGP), lithium-aluminum titanium phosphate (LATP), and derivatives thereof, and including from about 0.01 to about 5 wt % $Li_2O$; and c) a second polymer-ceramic electrolyte formed from polyethylene oxide doped with $LiN(SO_2CF_2CF_3)_2$ (Li- BETI) and including from about 0.01 to about 10 wt % boron nitride (BN). The laminate preferably has a thickness of about 1 to about 2,000 microns.

In the solid electrolyte laminate structure, the glass-ceramic electrolyte is preferably positioned between the first and second polymer-ceramic composite electrolytes. The laminate structure is preferably electrochemically coupled to the lithium metal anode in the lithium-air cell.

The oxygen cathode preferably comprises carbon and a lithium ion-conducting glass or glass-ceramic material selected from lithium aluminum germanium phosphate (LAGP), lithium-aluminum titanium phosphate (LATP), and derivatives thereof. Preferably, the oxygen cathode comprises from about 5 to 30 wt % carbon and from about 70-95 wt % of the glass or glass-ceramic material. The oxygen cathode preferably comprises a porous structure having from about 30 to 70% porosity.

The lithium-air cell of the invention preferably exhibits a Coulombic efficiency during a discharge to charge cycle of greater than 98% at a temperature of about 65 to 105° C. and an open circuit voltage of from about 2 to about 3.8V.

In another embodiment of the invention, a method of forming a solid electrolyte having enhanced ionic transport is provided. The method comprises providing a solid electrolyte selected from at least one polymer-ceramic electrolyte, a glass-ceramic electrolyte, or combinations thereof; and adding a dielectric additive to the solid electrolyte, where the solid electrolyte exhibits increased ionic transport when placed in a lithium-air cell and exhibits a conductivity between about $10^{-6}$ and $10^{-1}$ Scm$^{-1}$ at room temperature. The dielectric additive is selected from lithium oxide ($Li_2O$), boron nitride (BN), silica ($SiO_2$), alumina ($Al_2O_3$), calcium oxide (CaO), zirconium oxide ($ZrO_2$), titanium oxide ($TiO_2$), lithium aluminate ($LiAlO_2$), and silicon nitride ($Si_3N_4$), and is preferably added in an amount of from about 0.01 to about 10 wt %.

The dielectric additive preferably has a particle size of from about 5 nm to about 10,000 nm, and more preferably, from about 10 nm to 1,000 nm.

The polymer-ceramic electrolyte preferably comprises poly(ethylene oxide) doped with a lithium salt selected from the group consisting of $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, LiCl and LiI.

The glass-ceramic electrolyte is preferably selected from lithium-aluminum-germanium-phosphate (LAGP), lithium-aluminum titanium phosphate (LATP), and derivatives thereof.

In one embodiment of the invention, the solid electrolyte formed by the method comprises a polymer-ceramic composite comprising polyethylene oxide doped with LiN($SO_2CF_2CF_3$)$_2$ (LiBETI) and containing from about 0.01% to about 10 wt % $Li_2O$.

In another embodiment of the invention, the solid electrolyte formed by the method comprises a polymer-ceramic composite comprising polyethylene oxide doped with LiBETI and containing from about 0.01 to about 10 wt % BN.

In another embodiment, the solid electrolyte formed by the method comprises a glass-ceramic electrolyte selected from lithium-aluminum-germanium-phosphate (LAGP), lithium-aluminum titanium phosphate (LATP), and derivatives thereof and containing from about 0.01 to 5 wt % $Li_2O$.

In yet another embodiment, the solid electrolyte formed by the method is in the form of a laminate comprising a polymer-ceramic composite comprising polyethylene oxide doped with a lithium salt and containing from about 0.01 to about 10 wt % $Li_2O$; a glass-ceramic electrolyte selected from lithium-aluminum-germanium-phosphate (LAGP), lithium-aluminum titanium phosphate (LATP), and derivatives thereof, and containing from about 0.01 to 5 wt % $Li_2O$; and a polymer-ceramic composite comprising polyethylene oxide doped with a lithium salt and containing from about 0.01 to about 10 wt % BN.

Accordingly, it is a feature of the present invention to provide a liquid-free rechargeable lithium-air cell incorporating a solid electrolyte having enhanced ionic transport. This, and other features and advantages of the present invention, will become apparent from the following detailed description, the accompanying drawings, and the appended claims.

DETAILED DESCRIPTION OF PREFERRED EMBODIMENTS

Embodiments of the invention are applicable to a wide range of products including lithium-air batteries, fuel cells, and electrochemical sensors. The invention may be used in a variety of applications including, but not limited to, portable electronics, cell phones, laptop computers, cameras, and automotive applications.

The solid electrolytes based on polymer-ceramic and glass-ceramic materials having enhanced ionic transport are heterogeneous and provide liquid-like conductivity. The electrolytes are compatible with lithium metal, stabilizing the surface of lithium, and are stable in normal environmental conditions. Thus, the safety issues due to the reactivity of lithium are addressed by embodiments of the invention which use a solid state, substantially inorganic electrolyte which isolates lithium from moisture and atmospheric gases and prevents dendritic shorts.

The rechargeable lithium-air cell incorporating the solid electrolyte provides several advantages over the use of hydrogen-air cells currently in use. In the lithium-air cell, solid metallic lithium is used as the fuel source, minimizing containment and transportation issues. The solid lithium also functions as an anode. In contrast, in hydrogen-air cells, a membrane electrode assembly based on expensive precious metals such as platinum must be used to carry out the oxidation of hydrogen and reduction of oxygen. In addition, the open circuit voltage of the lithium-air cell is about 3.0 V, which is approximately 3 times that of the hydrogen-air cell. Lithium-air cells incorporating the solid electrolyte exhibit excellent thermal stability and rechargeability in the temperature range of about 30 to 105° C.

Figure 1:
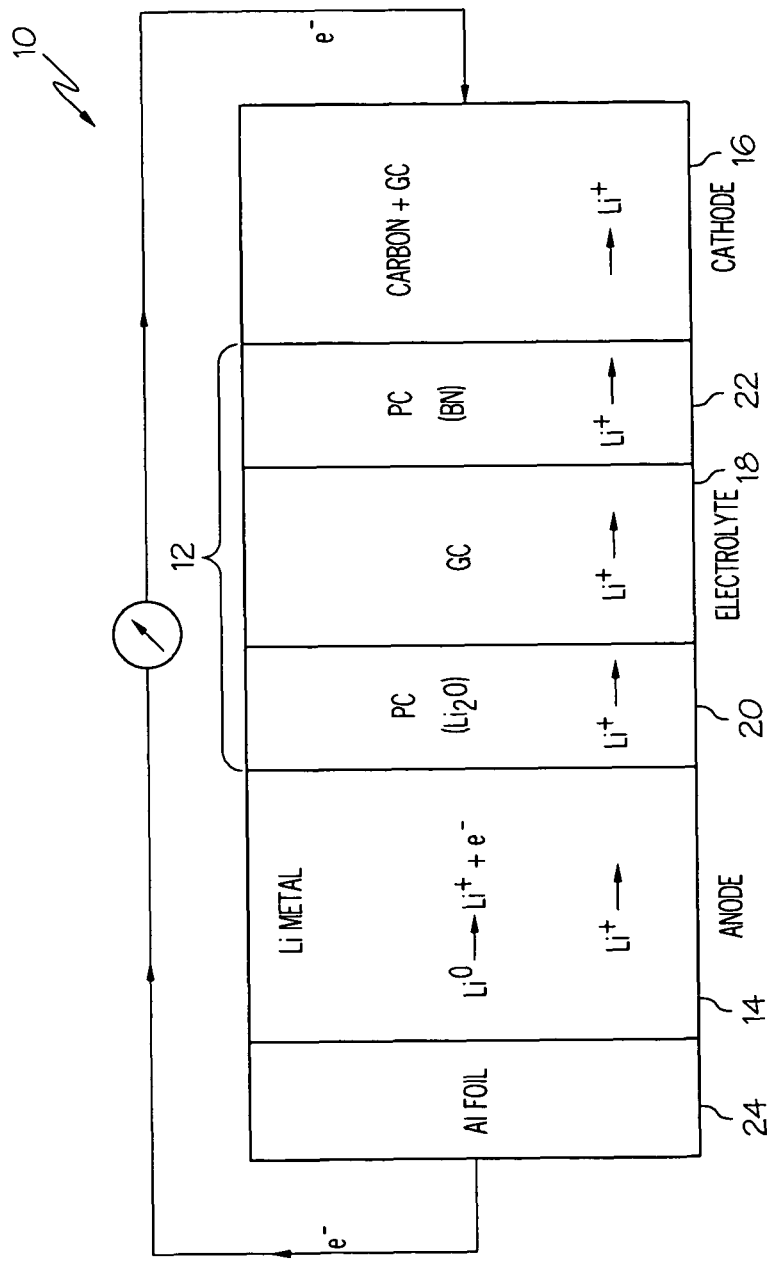
FIG. 1 is a schematic illustration of an electrochemical device showing the anode, electrolyte, cathode, and flow of ions and electrons.

Referring now to FIG. 1, a schematic illustration of a lithium-air cell 10 is shown which includes a solid electrolyte 12 having enhanced ionic transport. As shown, the cell includes a lithium metal anode 14 and an oxygen cathode 16 separated by the solid electrolyte 12. In the embodiment shown, the solid electrolyte 12 is in the form of a laminate comprising a glass-ceramic membrane 18 and polymer-ceramic membranes 20, 22. The glass-ceramic and polymer-ceramic membranes are preferably laminated together by stacking the formed membranes together and/or placing them together under pressure followed by a thermal treatment such as annealing so that the membranes are sufficiently bonded. Pressure may be applied using a spring load at a relatively small pressure of about 100 to 200 psi while annealing at 75° C. for about 2 hours.

The polymer-ceramic membrane 20 preferably comprises a PEO:LiBETI (8.5:1)-(1 wt % $Li_2O$) solid electrolyte electrochemically coupled to the lithium anode 14 and glass-ceramic membrane 18. The polymer-ceramic membrane 20 functions to reduce cell impedance, aid in catalyzing the anodic reaction and enhance rechargeability of the cell. By utilizing 1-2 wt % of $Li_2O$ as a dielectric additive, a passivating surface is formed on the surface of the lithium anode which is stable and allows effective transport of the lithium ion. The use of $Li_2O$ as a dielectric additive also contributes to the increased cycle life of the lithium anode.

The oxygen cathode 16 and glass-ceramic membrane 18 are coupled by polymer-ceramic membrane 22, which preferably comprises a PEO:LiBETI (8.5:1)-(1 wt % BN) electrolyte.

The glass-ceramic electrolyte membrane 18 is preferably formed from lithium aluminum germanium phosphate (LAGP), but may also be formed from lithium aluminum titanium phosphate (LATP) and derivatives of LAGP and LATP. The glass-ceramic membrane is preferably formed by mixing the chemicals comprising the LAGP or LATP composition and the desired amount of dielectric additive ($Li_2O$), then milling. The milled batch is heated to melt the glass, and then formed into transparent glass sheets which are preferably annealed and then crystallized at a temperature ranging from about 750 to 850° C. to transform the glass to a glass-ceramic material. Alternatively, the dielectric additive may be added by a precipitation reaction from the glass solution by formulating a batch which contains an excess of lithium oxide or lithium carbonate. The resulting glass-ceramic electrolyte preferably exhibits an ionic conductivity of about $10^{-2}$ $Scm^{-1}$ at 30° C.

The polymer-ceramic membranes 20 and 22 may be formed by an energy milling technique. Poly(ethylene)oxide and LiBETI may be mixed using an energy mill along with the desired dielectric additive. Following the milling, the milled material may be hot pressed into a membrane. Alternatively, the dielectric additive may be incorporated as a dispersant phase in the polymer solution. The resulting polymer-ceramic membranes preferably exhibit an ionic conductivity of about $10^{-4}$ to $10^{-}Scm^{-1}$ at 30° C.

The dielectric additives are preferably in powder form and comprise nanosize particles (about 5 nm to about 10,000 nm) having a high dielectric constant. Suitable dielectric additives include, but are not limited to, $Li_2O$, BN, $SiO_2$, $Al_2O_3$, CaO, $ZrO_2$, $TiO_2$, $LiAlO_2$, and $Si_3N_4$. The dielectric additive is preferably added in an amount of from about 0.01 to about 10 wt %.

The ionic conductivity of the polymer-ceramic and glass-ceramic solid electrolytes is enhanced due to the creation of the space charge within the bulk structure of the solid electrolyte resulting from the addition of the dielectric additive. In the case of the glass-ceramic membrane, the space charge effect results from the presence of the dielectric $Li_2O$ phase. In the polymer-ceramic membranes, the space charge effect results from the presence of the dielectric BN or $Li_2O$ phase. The increased conductivity results from lithium ions which are adsorbed on the dielectric surface, creating a space charge and an associated electric field, which influences transport of the remaining conducting ions. The space charge, once created, is stable, retaining its effects in the operating temperature region of the electrochemical device.

Referring again to FIG. 1, the lithium anode 14 comprises a lithium metal. The lithium anode may also comprise a lithium alloy. As shown, the lithium anode 14 is in contact with aluminum foil 24 on one side which functions to protect the anode.

The oxygen cathode 16 is a solid state composite prepared from high surface area carbon and ionically conducting glass or glass-ceramic powder. The glass or glass-ceramic powder is preferably formed from lithium aluminum germanium phosphate (LAGP), but may also be formed from lithium aluminum titanium phosphate (LATP) and derivatives of LAGP and LATP by mixing with an organic binder such as polytetrafluoroethylene (PTFE).

Preferably, the cathode comprises about 5 to 30 wt % carbon and from about 70-95 wt % of the glass or glass-ceramic material. The oxygen cathode preferably comprises a porous structure having from about 30 to 70% porosity. The carbon provides the platform for combining the oxygen with the lithium ion which originates from lithium, and moves through the electrolyte to form lithium peroxide or lithium oxide in the cathode. It is noted that while the oxygen cathode does not contain a catalyst, the cathode capacity is high. While not wishing to be bound by theory, it is believed that the LAGP material, which is the major component in the cathode, in combination with carbon, catalyzes the reduction of oxygen.

In use, the lithium-air cell incorporating the solid electrolyte membrane may be subjected to multiple discharge-charge cycles at current densities ranging from 0.05 to 0.15 $mA/cm^2$. The lithium-air cell is preferably discharged at a temperature range of 30 to 105° C., and the discharge/charge Coulombic efficiencies of the cell range from 98 to 100%. The open circuit voltage (OCV) of the Li-air cell may vary from 2.6 to 3.6 V, depending on the state of the charge/discharge. The cell may be charged in low oxygen pressure or even in a vacuum because the charging produces oxygen. It is only during the discharge cycle that oxygen is consumed to carry out the electrochemical reaction. Very little discharge capacity is obtained in the absence of oxygen. The discharge capacity is also believed to be dependent on the oxygen partial pressure.

In order that the invention may be more readily understood, reference is made to the following examples which are intended to illustrate the invention, but not limit the scope thereof.

Example 1

Polymer-ceramic composite formulations were prepared with and without dielectric additives (BN and $Li_2O$). First, a solid polymer-ceramic electrolyte was formed by providing poly(ethylene)oxide (PEO) (molecular weight 2,000,000 from Union Carbide) and $LiN(SO_2CF_2CF_3)_2$ (LiBETI from 3M). The PEO and LiBETI were dried in an oven at 50° C. and 60° C., respectively, for 48 hours. The PEO:LiBETI (8.5:1) electrolyte was prepared by a solvent-free energy milling technique. The chemicals were weighed inside a glove box maintained at <50 ppm of $O_2$ and <88 ppm of $H_2O$. The batch was contained in an airtight metallic jar and subsequently mixed using an energy mill (Spex Certi Pep 8000D mixer/mill) for 1 hour without a stainless steel ball. Following the milling, 300 mg of the milled material was loaded into a preheated die (about 100° C.) and then pressed with 5 ton/$cm^2$ pressure into a disc.

Composites of PEO:LiBETI including dielectric additives (BN and $Li_2O$) were then prepared using a similar procedure ((PEO:LiBETI (8.5:1)-BN (1 wt %) and PEO:LiBETI (8.5:1)-$Li_2O$ (1 wt %)). Both nanosize (5-20 nm) BN and $Li_2O$ powder were obtained from Alfa Aesar and used as received. AC impedance measurements on the specimens were carried out using a Solartron instrument (Model 1260 with an electrochemical interface; Solartron US, Houston, Tex.) in the 0.01 to 106 Hz frequency range. The specimens were placed into a cell using stainless steel or lithium as electrodes in a cell fixture. The fixture containing the cell was subsequently placed in a holder with attached electrical wires leading to the impedance spectrometer. The AC impedance of the cells was measured at the appropriate temperature range. At each temperature, the specimen was equilibrated for 1 hour before the impedance measurement. AC impedance of the cells was also measured periodically for more than 1000 hours of storage at ambient temperature. Z Plot and Z View software packages were employed for data acquisition and analysis. The cell conductivity was computed from the AC impedance spectra and geometrical dimensions.

The specimens tested at temperatures above 65° C. exhibited liquid-like conductivity with an activation energy of 0.36 eV, 0.36, and 0.35 eV/mol for the PEO:LiBETI, PEO:LiBETI-BN and PEO:LiBETI-$Li_2O$ electrolytes, respectively.

The PEO:LiBETI-BN and PEO:LiBETI-$Li_2O$ specimens showed higher conductivity compared with the PEO:LiBETI polymer specimen. While the data indicated that the space charge effect remains operative across the temperature range of 25 to 120° C., it was noted that the space charge effect was more prominent in the liquid state (60 to 120° C.) than in the solid state (25-60° C.).

The enhanced conductivity in the specimens containing the BN and $Li_2O$ dielectric additives is attributed to the space-charge mediated transport of lithium ions.

Figure 2:
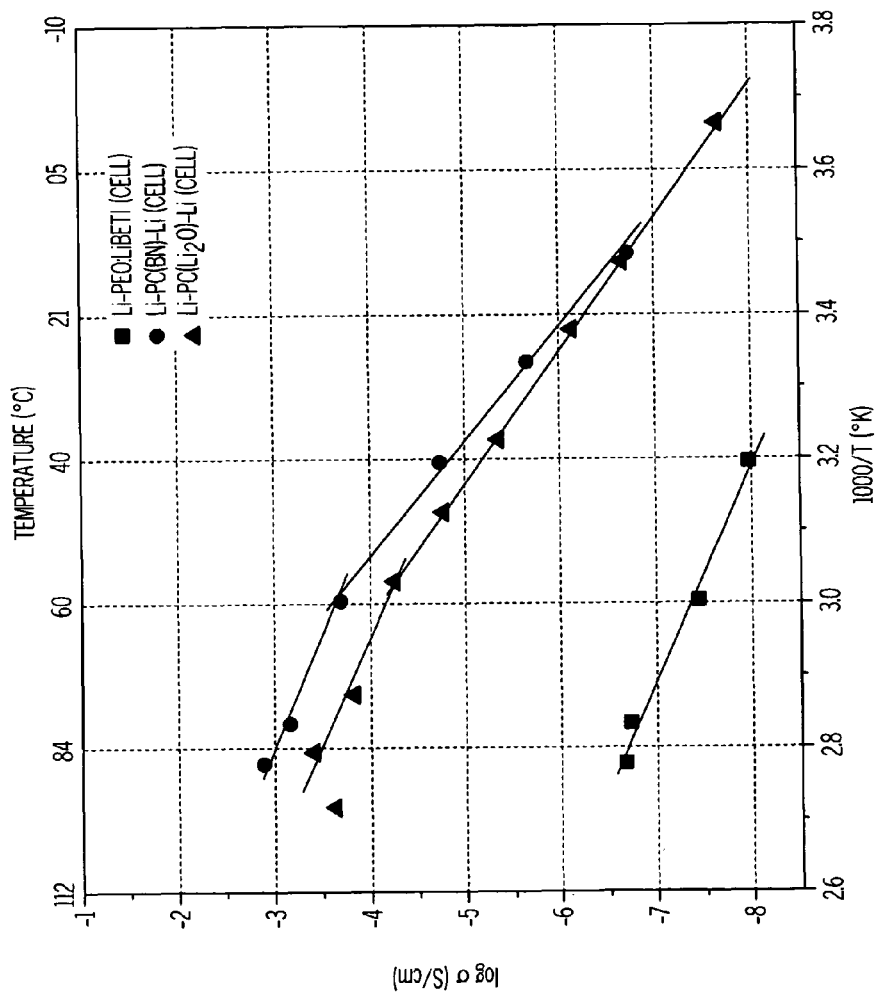
FIG. 2 is a graph illustrating the conductivity of cells incorporating PEO:LiBETI with and without the inclusion of dielectric additives.

FIG. 2 illustrates a comparison of conductivities of cells containing PEO:LiBETI, PEO:LiBETI-BN, and PEO:LiBETI-$Li_2O$. As can be seen, the incorporation of the dielectric additives BN and $Li_2O$ enhances cell conductivity.

Example 2

Ionically conducting glass-ceramic specimens based on lithium-aluminum-germanium-phosphate were prepared with varying concentrations of lithium oxide as a dielectric phase to create a space charge effect on ionic transport.

A 40 gram batch of $19.75Li_2O \cdot 6.17Al_2O_3 \cdot 37.04GeO_2 \cdot 37.04P_2O_5$ (mol %) (LAGP) composition was prepared using reagent grade chemicals $Li_2CO_3$ (Alfa Aesar), $Al_2O_3$ (Aldrich, particle size <10 mm), $GeO_2$ (Alfa Aesar) and $NH_4H_2PO_4$ (Acros Organics). The chemicals were weighed, mixed and ground for 10 minutes with an agate mortar and pestle. For further homogenization, the batch was milled in a glass jar for one hour using a roller mill. The milled batch was contained in a platinum crucible and transferred to an electric furnace. Initially, the furnace was heated to 350° C. at the rate of 1° C./minute after which the glass was melted for 2 hours. A clear, homogeneous, viscous melt was poured onto a stainless steel plate at room temperature and pressed by another stainless steel plate to yield <1 mm thick transparent glass sheets. Subsequently, the cast and pressed glass sheets were annealed at 500° C. for 2 hours to release thermal stresses and then allowed to cool to room temperature. The annealed glass specimens were subsequently crystallized in the 750 to 850° C. temperature range for selected times to transform the glass to a glass-ceramic.

Table 1 below illustrates the molar composition of the LAGP compositions in which lithium oxide concentration is a variable. The LAGP-1 composition represents a baseline formulation corresponding to the $Li_{1.5}Al_{0.5}Ge_{1.5}(PO_4)_3$ stoichiometry. In the other compositions (LAGP-2, -3, and -4), the $Li_2O$ concentration was gradually increased with an intent to precipitate $Li_2O$ as a dielectric phase in the glass-ceramic matrix.

TABLE 1

| Composition | LAGP-1 | LAGP-2 | LAGP-3 | LAGP-4 |
| --- | --- | --- | --- | --- |
| $Li_2O$ | 18.75 | 19.75 | 21.12 | 21.56 |
| $Al_2O_3$ | 6.25 | 6.17 | 6.07 | 6.03 |
| $GeO_2$ | 37.50 | 37.04 | 36.41 | 36.20 |
| $P_2O_5$ | 37.50 | 37.04 | 36.41 | 36.20 |
| Stoichiometry $Li_{1+x}Al_xGe_{2-x}(PO_4)_3$ | x = 0.5 | x = 0.5 +$Li_2O$ = 1.00% | x = 0.5 +$Li_2O$ = 2.37% | x = 0.5 +$Li_2O$ = 2.81% |

DSC (differential scanning calorimetry) scans of all 4 specimens were performed from room temperature to 700° C. All the specimens showed an inflection around 500° C., which is related to the glass transition temperature ($T_g$). As the $Li_2O$ concentration was increased from the LAGP-1 to the LAGP-4 specimens, the $T_g$ decreased slightly from 522 to 511° C. in all specimens except for LAGP-2. The DSC data suggested that the $Li_2O$ addition slightly reduced the viscosity of the glass, resulting in the lowering of the $T_g$ and $T_c$.

After crystallization of the LAGP-2 and LAGP-2 specimens at 850° C. for 12 hours, the LAGP-2 specimen was found to exhibit the highest conductivity with room temperature conductivity approaching $10^{-2}$ $Scm^{-1}$. The increase in conductivity from LAGP-1 to LAGP-2 is attributed to the excess of $Li_2O$ as shown in Table 1. It is believed that the $Li_2O$ precipitates and creates a space charge effect, which enhances the conductivity of LAGP-2. Additional amounts of $Li_2O$ in LAGP-3 and LAGP-4 were shown to be detrimental to the conductivity because it formed an excess of the glassy phase, which is believed to be an impediment to the transport of lithium ions through the grain boundaries.

Table 2 below illustrates the activation energies for ionic transport in the four LAGP specimens.

TABLE 2

| Specimens | Below 70° C. (eV) | Above 70° C. (eV) |
| --- | --- | --- |
| LAGP-1 | 0.62 | 0.30 |
| LAGP-2 | 0.62 | 0.30 |
| LAGP-3 | 0.50 | 0.16 |
| LAGP-4 | 0.45 | 0.16 |

Table 3 below illustrates the temperature dependent conductivity of the LAGP-2 specimen after crystallization at 850° C. for 12 hours.

TABLE 3

| Temperature (° C.) | Conductivity (Scm$^{-1}$) |
|---|---|
| 23 | $4.48 \times 10^{-3}$ |
| 30 | $6.18 \times 10^{-3}$ |
| 50 | $3.81 \times 10^{-2}$ |
| 70 | $1.69 \times 10^{-1}$ |
| 110 | $5.19 \times 10^{-1}$ |
| 150 | 1.07 |
| 210 | 2.06 |
| 250 | 2.63 |
| 310 | 4 |
| 360 | $1.58 \times 10^{-1}$ |
| 390 | $2 \times 10^{-1}$ |
| 450 | $2.85 \times 10^{-1}$ |

The conductivity value of 4 Scm$^{-1}$ of specimen LAG P-2 at 310° C. is attributed to the space charge mediation induced by the formation of a Li$_2$O:Li$^+$ complex, which becomes a source of a local electric field that influences the transport of the remaining conducting ions.

Example 3

A lithium-air cell incorporating a solid electrolyte in the form of a laminate was constructed as follows. Two polymer-ceramic membranes were prepared from dried poly(ethylene) oxide, LiBETI salt, and dielectric additives Li$_2$O and BN, respectively as described above in Example 1. The dried mixture of the electrolyte components were energy milled and hot pressed to obtain 200 to 400 μm thick membranes.

A glass-ceramic membrane was prepared from a batch of various oxides corresponding to the 18.5Li$_2$O.6.07Al$_2$O$_3$.37.05GeO$_2$.37.05P$_2$O$_5$ molar composition as described in Example 2. The batch was melted at 1350° C. in a platinum crucible and then cast onto a steel plate, such that the glass solidified. The solidified glass was then powdered and pressed into a membrane, followed by sintering from about 800 to about 850° C. for about 8 to 24 hours. The glass-ceramic membrane was then laminated between the two polymer-ceramic membranes.

A lithium anode was obtained from Lithium Corporation of America.

A cathode was prepared using nickel mesh or foam, carbon black (acetylene 50% compressed), Teflon (TE-3859) and a glass-ceramic powder comprising LAGP which was formed as described in Example 2. A mixture of the carbon black (25 and 50 wt %), LAGP (50 and 75 wt %) powders, and Teflon were mixed with de-ionized water to obtain a soft mass which was spread on both sides of the nickel mesh or foam and sandwiched between two stainless steel plates. The assembled sandwich was pressed, dried at 100° C. overnight and sintered at 240° C. for 20 minutes in an argon atmosphere. The Li-air cells were assembled in a dry box (O$_2$<80 ppm, H$_2$<89 ppm) contained in the casing with a spacer and O-ring. The cathode side of the casing was perforated to allow flow of oxygen to the cathode. The cell components along the casing were pressed to seal using a Hohsen cell maker (Hohsen Corporation, Osaka, Japan) into a working lithium-air cell.

The assembled cells were characterized using a Solartron instrument (Model 1260 with an electrochemical interface; Solartron US, Houston, Tex.). The charge and discharge capacities of the cells were measured by cycling them at constant currents between voltage limits, and interfacial impedances were determined from AC impedance spectra measured in the 0.1 to 106 Hz frequency range. The physical constants of the cell components for cells 3, 4 and 5 are shown in Table 4 below.

TABLE 4

| Cell | Lithium anode | | Membrane laminate | | | Cathode | | | | Cell Structure |
|---|---|---|---|---|---|---|---|---|---|---|
| | Thick (cm) | Weight (gm) | Material | Thick (cm) | Weight (gm) | Material | Thick (cm) | Weight (gm) | Porosity (%) | |
| 3 | 0.038 | 0.040 | PC(BN)/ LAGP/ PC(BN) | 0.150 | 0.68 | 25% C* + 75% LAGP on Ni mesh | 0.048 | 0.163 | 12 | Li/PC(BN)/ LAGP/PC(BN)/ cathode-O$_2$ |
| 4 | 0.038 | 0.040 | PC(Li$_2$O)/ LAGP/ PC(BN) | 0.205 | 0.58 | 50% C* + 75% LAGP on Ni foam | 0.045 | 0.172 | 27 | Li/PC(Li$_2$O)/ LAGP/PC(BN)/ cathode-O$_2$ |
| 5 | 0.038 | 0.040 | PC(Li$_2$O)/ LAGP/ PC(BN) | 0.101 | 0.46 | 25% C* + 75% LAGP on Ni foam | 0.031 | 0.146 | 24 | Li/PC(Li$_2$O)/ LAGP/PC(BN)/ cathode-O$_2$ |

C* - 60% PWA activated carbon + 40% Ketjen carbon black

The electrochemical performance of cell 5 is shown in Table 5 below.

TABLE 5

| T (° C.) | D/C cycle | D/C current (mA) | D/C time (hrs) | Cell capacity (mAh) | Anode capacity utilized | Cathode capacity utilized | R$_{cell}$ (Ω) | V'$_{cell}$ (Volt) | V"$_{cell}$ (Volt) | σ$_{cell}$ (mS/cm) |
|---|---|---|---|---|---|---|---|---|---|---|
| 30 | 1D | 0.05 | 1.24 | 0.06 | 0.04 | 3.16 | 13339 | 2.66 | 1.00 | 0.009 |
| 30 | 1C | 0.20 | 0.32 | 0.06 | 0.04 | 3.37 | 6432 | 3.74 | 4.30 | 0.019 |
| | 1C (1) | 0.20 | 0.04 | 0.01 | 0.01 | 0.53 | 5099 | 3.96 | 4.30 | 0.025 |
| 45 | 2D | 0.10 | 1.24 | 0.08 | 0.12 | 6.32 | 2663 | 2.91 | 1.00 | 0.047 |
| 45 | 2C | 0.20 | 0.55 | 0.11 | 0.07 | 5.79 | 1040 | 3.19 | 4.30 | 0.121 |
| 57 | 3D | 0.10 | 11.36 | 1.14 | 0.73 | 59.60 | 1019 | 3.19 | 1.00 | 0.123 |
| 57 | 3C | 0.20 | 6 | 1.20 | 0.77 | 63.16 | 305 | 3.06 | 4.25 | 0.413 |
| 67 | 4D | 0.20 | 13.83 | 2.77 | 1.77 | 145.79 | 241 | 3.48 | 1.00 | 0.523 |
| 67 | 4C | 0.20 | 14 | 2.80 | 1.80 | 147.37 | 158 | 2.89 | 4.17 | 0.797 |

TABLE 5-continued

| T (° C.) | D/C cycle | D/C current (mA) | D/C time (hrs) | Cell capacity (mAh) | Anode capacity utilized | Cathode capacity utilized | $R_{cell}$ (Ω) | $V'_{cell}$ (Volt) | $V''_{cell}$ (Volt) | $\sigma_{cell}$ (mS/cm) |
|---|---|---|---|---|---|---|---|---|---|---|
| 75 | 5D | 0.20 | 66.03 | 13.21 | 8.47 | 695.26 | 174 | 3.45 | 1.00 | 0.724 |
| 75 | 5C | 0.30 | 41.89 | 12.57 | 8.06 | 661.57 | 288 | 2.79 | 4.50 | 0.437 |
|  | 5C(1) | 0.20 | 5.00 | 1.00 | 0.74 | 52.63 | 351 | 3.70 | 4.46 | 0.359 |
| 85 | 6D | 0.25 | 49.56 | 12.39 | 7.95 | 652.10 | 134 | 3.39 | 1.00 | 0.941 |
| 85 | 6C | 0.30 | 28.43 | 8.53 | 5.47 | 448.95 | 270 | 2.69 | 4.30 | 0.466 |
|  | 6C(1) | 0.20 | 8.90 | 1.78 | 1.14 | 93.68 | 317 | 3.39 | 4.30 | 0.397 |
| 105 | 7D | 0.20 | 80.54 | 16.11 | 10.33 | 847.89 | 125 | 3.31 | 1.00 | 1.00 |
| 105 | 7C | 0.30 | 37.5 | 11.25 | 7.21 | 592.10 | 141 | 1.22 | 4.3 | 0.89 |
|  | 7C(1) | 0.20 | 8.62 | 1.72 | 1.10 | 90.53 | 234 | 3.55 | 4.3 | 0.54 |
|  | 7C(2) | 0.20 | 16 | 3.2 | 2.05 | 168.42 | 216 | 3.49 | 4.41 | 0.58 |

Figure 3:
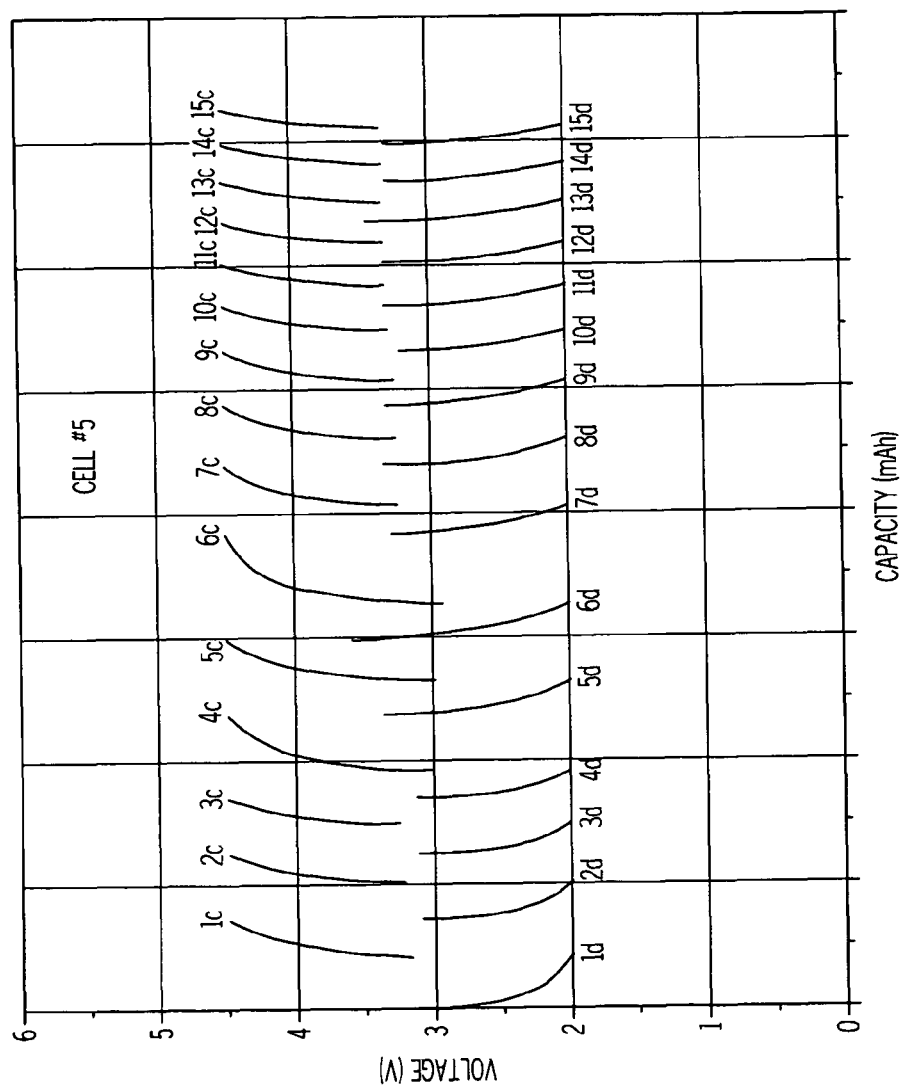
FIG. 3 is a graph illustrating discharge and charge capacities of a lithium air-cell during multiple cycles.

Notations:
T—temperature,
D—discharge,
C—charge,
$R_{cell}$ - cell resistance in D/C state,
$V'_{cell}$ - cell voltage before D/C,
$V''_{cell}$ - cell voltage after D/C, and
$\sigma_{cell}$ - cell conductivity Cell 5 was subjected to a multiple discharge/charge cycles at 95° C. as a function of capacity with a discharge current of 0.3 mA. The charge current was varied from 0.15 to 0.3 mA. The capacity during the multiple discharge/charge cycles is shown in Table 6 below and in FIG. 3.

TABLE 6

| discharge | current (mA) | capacity (mAh) | charge | current (mA) | capacity (mAh) |
|---|---|---|---|---|---|
| 1 | 0.3 | 0.43 | 1 | 0.3 | 0.30 |
| 2 | 0.3 | 0.30 | 2 | 0.3 | 0.23 |
| 3 | 0.3 | 0.25 | 3 | 0.3 | 0.21 |
| 4 | 0.3 | 0.22 | 4 | 0.2 | 0.46 |
| 5 | 0.3 | 0.27 | 5 | 0.2 | 0.33 |
| 6 | 0.3 | 0.29 | 6 | 0.15 | 0.57 |
| 7 | 0.3 | 0.24 | 7 | 0.15 | 0.32 |
| 8 | 0.3 | 0.22 | 8 | 0.15 | 0.27 |
| 9 | 0.3 | 0.20 | 9 | 0.15 | 0.24 |
| 10 | 0.3 | 0.17 | 10 | 0.15 | 0.20 |
| 11 | 0.3 | 0.17 | 11 | 0.15 | 0.18 |
| 12 | 0.3 | 0.16 | 12 | 0.15 | 0.17 |
| 13 | 0.3 | 0.16 | 13 | 0.15 | 0.17 |
| 14 | 0.3 | 0.15 | 14 | 0.15 | 0.16 |
| 15 | 0.3 | 0.13 | 15 | 0.15 | 0.15 |

Having described the invention in detail and by reference to preferred embodiments thereof, it will be apparent that modifications and variations are possible without departing from the scope of the invention.

What is claimed is:

1. A liquid-free rechargeable lithium-air cell comprising:
a lithium anode an anode comprising a lithium metal, at which oxidation of lithium metal to lithium ions occurs during discharge cycles of the lithium-air cell;
a porous cathode at which reduction of oxygen and formation of lithium oxide or lithium peroxide occur during the discharge cycles of the lithium-air cell, the porous cathode comprising a carbon material and at least one of a lithium-ion conducting glass or a lithium-ion conducting glass-ceramic material; and
a lithium-ion conducting solid electrolyte separating said lithium anode and said porous cathode, the lithium-ion conducting solid electrolyte comprising a glass-ceramic membrane, the glass-ceramic membrane comprising a glass-ceramic matrix and a dielectric phase of $Li_2O$ in the glass-ceramic matrix, the glass-ceramic matrix selected from lithium-aluminum-germanium phosphate (LAGP) or lithium-aluminum-titanium phosphate (LATP), wherein said glass-ceramic membrane contains from 0.01 wt % to about 5 wt % $Li_2O$ dielectric phase, based on the total weight of the glass-ceramic membrane.

2. The lithium air cell of claim 1 wherein said porous cathode is a composite comprising the carbon material, a lithium-ion conducting glass-ceramic material selected from lithium aluminum germanium phosphate (LAGP) and lithium-aluminum titanium phosphate (LATP), and an organic binder that binds the carbon material and the lithium-ion conducting glass-ceramic material.

3. A liquid-free lithium-air cell comprising:
a lithium anode an anode comprising a lithium metal at which oxidation of lithium metal to lithium ions occurs during discharge cycles of the lithium-air cell;
a porous cathode at which reduction of oxygen and formation of lithium oxide or lithium peroxide occur during the discharge cycles of the lithium-air cell, the porous cathode comprising from 70 wt. % to 95 wt. % lithium-aluminum germanium phosphate (LAGP) and from 5 wt. % to 30 wt. % of a carbon material; and
a solid electrolyte separating said lithium anode and said porous cathode, the solid electrolyte comprising a glass-ceramic membrane, wherein said glass-ceramic membrane comprises a glass-ceramic matrix and a dielectric phase of $Li_2O$ particles in the glass-ceramic matrix, the glass-ceramic membrane containing from 0.01 wt % to 5 wt % dielectric phase, based on the total weight of the glass-ceramic membrane, and
wherein the lithium-air cell is completely free of liquid components.

4. The lithium-air cell of claim 3 wherein said porous cathode does not contain an oxygen reduction catalyst in addition to the lithium-aluminum-germanium phosphate (LAGP) and the carbon in combination.

5. The lithium-air cell of claim 3 wherein said porous cathode further comprises a binder comprising polytetrafluoroethylene.

6. The lithium-air cell of claim 3 wherein said porous cathode has porosity of from about 30% to 70%.

7. The lithium-air cell of claim 3, wherein the glass-ceramic matrix is lithium-aluminum-germanium phosphate and the $Li_2O$ particles have particle sizes of from 5 nm to 10,000 nm.

8. The lithium-air cell of claim 3, further comprising a casing that contains the lithium anode, the porous cathode, and the lithium-ion conducting solid electrolyte, the casing being perforated to allow flow of oxygen to the porous cathode during the discharge cycles.

9. The lithium-air cell of claim 1, wherein the lithium-air cell is completely free of liquid components.

10. The lithium-air cell of claim 1 wherein said porous cathode comprises from 5 wt. % to 30 wt. % carbon and from 70 wt. % to 95 wt. % lithium-aluminum germanium phosphate.

11. The lithium-air cell of claim 1, further comprising a casing that contains the lithium anode, the porous cathode, and the lithium-ion conducting solid electrolyte, the casing being perforated to allow flow of oxygen to the porous cathode during the discharge cycles.

12. The lithium-air cell of claim 1, wherein the glass-ceramic membrane is prepared with a stoichiometric excess of lithium sufficient to cause $Li_2O$ to precipitate in the glass-ceramic matrix as the dielectric phase when the glass-ceramic matrix forms.

13. The lithium-air cell of claim 1, wherein the glass-ceramic matrix is lithium-aluminum-germanium phosphate.

14. The lithium-air cell of claim 13, wherein:
the lithium-aluminum-germanium phosphate is $Li_{1.5}Al_{0.5}Ge_{1.5}(PO_4)_3$; and
the dielectric phase of $Li_2O$ in the glass-ceramic matrix is formed by preparing the $Li_{1.5}Al_{0.5}Ge_{1.5}(PO_4)_3$ with a stoichiometric excess of lithium sufficient to cause $Li_2O$ to precipitate in the glass-ceramic matrix as the dielectric phase when the glass-ceramic matrix forms.

15. The lithium-air cell of claim 14, wherein the stoichiometric excess of $Li_2O$ is 1 mol. %.

16. The lithium-air cell of claim 1, wherein the $Li_2O$ of the dielectric phase is $Li_2O$ particles having particle sizes from 5 nm to 10,000 nm.

17. The lithium-air cell of claim 1, wherein $Li^+$ ions adsorb to the $Li_2O$ particles in the glass-ceramic matrix during the discharge cycles to form $Li_2O:Li^+$ complexes that produce a local electric field and a space charge effect.

18. The lithium-air cell of claim 1, further comprising:
a first polymer-ceramic membrane between the lithium anode and the lithium-ion conducting solid electrolyte; and
a second polymer-ceramic membrane between the porous cathode and the lithium-ion conducing solid electrolyte.

19. The lithium-air cell of claim 18, wherein:
the first polymer-ceramic membrane comprises a first composite of polyethylene oxide and $LiN(SO_2CF_2CF_3)_2$, the first composite containing from about 0.01 wt. % to about 10 wt. % $Li_2O$ particles, based on the total weight of the first composite;
the second polymer-ceramic membrane comprises a second composite of polyethylene oxide and $LiN(SO_2CF_2CF_3)_2$, the second composite containing from about 0.01 wt. % to about 10 wt. % wt % BN particles, based on the total weight of the second composite.

20. The lithium-air cell of claim 19, wherein:
a weight ratio of polyethylene oxide to $LiN(SO_2CF_2CF_3)_2$, in the first composite is 8.5:1;
a weight ratio of polyethylene oxide to $LiN(SO_2CF_2CF_3)_2$, in the second composite is 8.5:1;
the first composite contains 1 wt. % $Li_2O$ particles, based on the total weight of the first composite; and
the second composite contains 1 wt. % BN particles, based on the total weight of the second composite.

21. The lithium-air cell of claim 19, wherein the $Li_2O$ particles and the BN particles have particle sizes from 5 nm to 20 nm.

* * * * *

UNITED STATES PATENT AND TRADEMARK OFFICE
CERTIFICATE OF CORRECTION

PATENT NO. : 9,178,255 B2  
APPLICATION NO. : 12/486444  
DATED : November 3, 2015  
INVENTOR(S) : Binod Kumar et al.

Page 1 of 1

It is certified that error appears in the above-identified patent and that said Letters Patent is hereby corrected as shown below:

Claims

Col. 11, Claim 1, Line 66,
"glass-ceramic matrix and a dielectric phase of $Li_20$ in the" should read
--glass-ceramic matrix and a dielectric phase of $Li_2O$--;

Col. 12, Claim 7, Line 66,
"the $Li_20$ particles have particle sizes of from 5 nm to 10,000" should read
--the $Li_2O$ particles have particle sizes of from 5 nm to 10,000--; and Col. 14, Claim 19, Line 21,
"about 0.01 wt.% to about 10 wt.% wt% BN particles," should read
--about 0.01 wt.% to about 10 wt.% BN particles,--.

Signed and Sealed this  
Twenty-eighth Day of June, 2016

Michelle K. Lee  
*Director of the United States Patent and Trademark Office*